(12) United States Patent
Priest (10) Patent No.: US 10,595,502 B2
(45) Date of Patent: Mar. 24, 2020

(54) LIVESTOCK BUILDING DESIGN AND CONTROL

(71) Applicant: DDI, Inc., Dubuque, IA (US)

(72) Inventor: John Brian Priest, Dubuque, IA (US)

(*) Notice: Subject to any disclaimer, the term of this patent is extended or adjusted under 35 U.S.C. 154(b) by 832 days.

(21) Appl. No.: 15/130,869

(22) Filed: Apr. 15, 2016

(65) Prior Publication Data

US 2016/0227726 A1 Aug. 11, 2016

Related U.S. Application Data

(63) Continuation-in-part of application No. 13/216,206, filed on Aug. 23, 2011, now Pat. No. 9,347,451.

(60) Provisional application No. 62/148,116, filed on Apr. 15, 2015.

(51) Int. Cl.
| | | |
|---|---|---|
| *A01K 1/00* | (2006.01) | |
| *F04D 25/16* | (2006.01) | |
| *F24F 11/00* | (2018.01) | |
| *F24F 11/30* | (2018.01) | |
| *F24F 120/10* | (2018.01) | |
| *F24F 110/10* | (2018.01) | |
| *F24F 11/64* | (2018.01) | |
| *F24F 110/20* | (2018.01) | |
| *F24F 11/52* | (2018.01) | |
| *F24F 11/77* | (2018.01) | |
| *F24F 120/20* | (2018.01) | |

(52) U.S. Cl.
CPC .......... *A01K 1/0052* (2013.01); *A01K 1/0047* (2013.01); *F04D 25/166* (2013.01); *F24F 11/0001* (2013.01); *F24F 11/30* (2018.01); *F24F 11/52* (2018.01); *F24F 11/64* (2018.01); *F24F 11/77* (2018.01); *F24F 2110/10* (2018.01); *F24F 2110/20* (2018.01); *F24F 2120/10* (2018.01); *F24F 2120/20* (2018.01); *F24F 2221/14* (2013.01); *F24F 2221/17* (2013.01)

(58) Field of Classification Search
CPC .... A01K 1/0052; A01K 1/0047; F04D 25/166
USPC ........................................................ 454/338
See application file for complete search history.

(56) References Cited

U.S. PATENT DOCUMENTS

| | | | | |
|---|---|---|---|---|
| 4,369,030 A * | 1/1983 | Siccardi | ........................ | 432/37 |
| 4,609,346 A * | 9/1986 | Siccardi | ........................ | 432/222 |
| 4,829,885 A * | 5/1989 | McVicker | ..................... | 454/185 |
| 5,336,131 A * | 8/1994 | Crider et al. | ................ | 454/238 |
| 5,666,905 A * | 9/1997 | Mackin et al. | ............... | 119/448 |
| 5,699,284 A * | 12/1997 | Muramatsu | ...................... | 703/1 |
| 7,555,413 B2 * | 6/2009 | Inagaki | ............................ | 703/2 |
| 8,635,974 B2 * | 1/2014 | Lemmon et al. | ............. | 119/448 |

(Continued)

OTHER PUBLICATIONS

Zhang, Zhao, "Modeling of Airflow and Contaminant Transport in Enclosed Environments", Dec. 2007, Purdue University, 2008, ProQuest Information and Learning Company.*

(Continued)

*Primary Examiner* — Edelmira Bosques
*Assistant Examiner* — Dana K Tighe
(74) *Attorney, Agent, or Firm* — Rathe Lindenbaum LLP (57) ABSTRACT

Kinetic energy devices, such as fans or blowers, are selected or controlled to attain a determined optimal overall average airflow for a volume within a livestock building to satisfy one or more predetermined livestock production objectives.

16 Claims, 6 Drawing Sheets

(56) References Cited

U.S. PATENT DOCUMENTS

2012/0303339 A1*  11/2012  Cruz ................................. 703/2
2013/0317794 A1*  11/2013  Chen et al. ....................... 703/2

OTHER PUBLICATIONS

Sapounas et al., "Simulating the Effect of Forced Pit Ventilation on Ammonia Emission From a Naturally Ventilated Cow House With CFD", 2009, European Conference on Precision Livestock Farming; Precision livestock farming Sep. 4, 81-90; Precision livestWageningen UR, Plant Science Group, The Netherlands.*

* cited by examiner

LIVESTOCK BUILDING DESIGN AND CONTROL

CROSS REFERENCE TO RELATED APPLICATIONS

The present application is a non-provisional application claiming priority under 35 USC 119 from U.S. Provisional Patent Application Ser. No. 62/148,116 filed on Apr. 15, 2015 by John Brian Priest and entitled LIVESTOCK BUILDING DESIGN AND CONTROL, the full disclosure of which is hereby incorporated by reference. The present application claims priority under 35 USC 120 from co-pending U.S. patent application Ser. No. 13/216,206 filed on Aug. 23, 2011 by John Brian Priest and entitled LIVESTOCK BUILDING DESIGN, the full disclosure of which is hereby incorporated by reference.

BACKGROUND

Livestock production depends upon the ability of the livestock to chemically convert feed or nutrients into products such as meat, eggs and milk. Such livestock production is highly dependent upon the ability of the livestock to dissipate body heat produced by such chemical activity to the surrounding environment. Because existing livestock building designs lack any meaningful similitude for convective heat release, it is difficult to optimize environmental conditions for different building configurations to maximize livestock production.

DETAILED DESCRIPTION OF EXAMPLES

Figure 1:
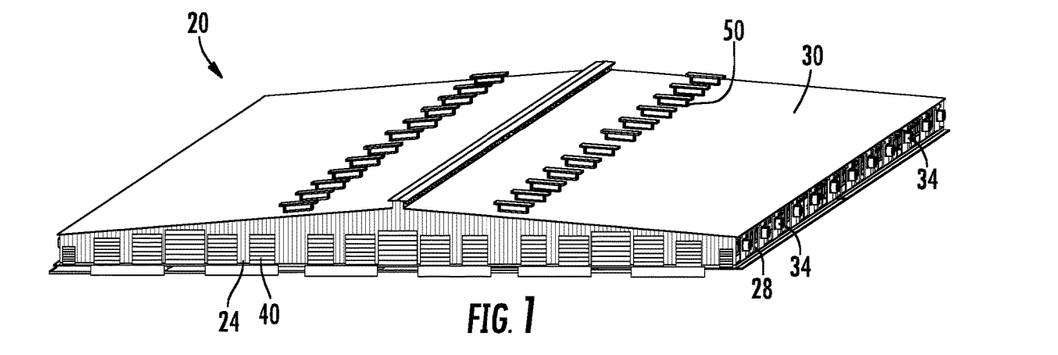
FIG. 1 is a top perspective of a livestock building according to an example embodiment.
Figure 2:
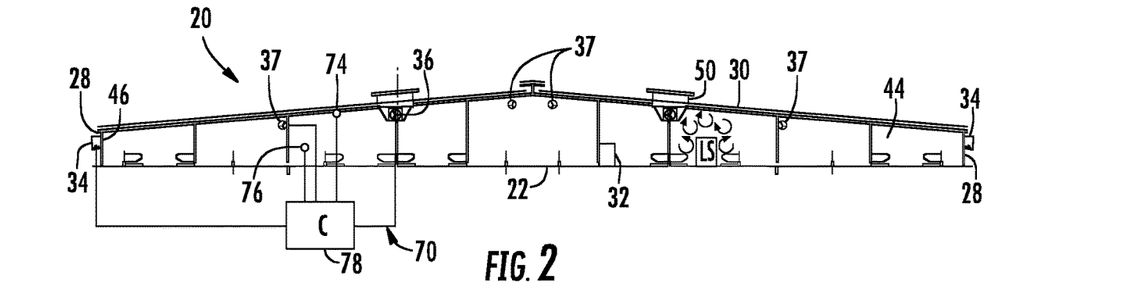
FIG. 2 is a sectional view of the livestock building a FIG. 1.

FIGS. 1 and 2 illustrate an example livestock building 20, a positive pressure building, designed or configured to more efficiently dissipate body heat produced by livestock to enhance livestock production. As will be described hereafter, livestock building 20 is designed to provide optimal environmental conditions for livestock production according to a methodology which provides building design similitude, wherein other buildings having different configurations may be provided with substantially duplicate optimal environmental conditions. Through similitude, this method provides enhanced flexibility and optimization of the turbulent environment, while maintaining customization in the design of livestock buildings in different locations and other unique building criteria.

As shown by FIGS. 1 and 2, livestock building 20 comprises floor 22, front walls 24, rear walls (not shown), side walls 28, roof or ceiling 30, livestock equipment 32, supply fans 34, ceiling supply fans 36 and mixing fans 37. Floor 22 serves as a foundation or bottom of building 20. Front walls 24 and the rear walls extend upwardly from floor 22. In the example illustrated, at least not lost 24 include one or more doors 40 through which livestock may enter and exit an interior 44 of building 20.

Side walls 28 extend upwardly from floor 22. Side walls 28 include openings 46 in which supply fans 34 are supported and through which air is blown into interior 44. Ceiling 30 extends across or over and above the floor 22. Ceiling 30 includes openings 50 in which ceiling supply fans 36 are supported and through which air is blown into interior 44.

Livestock equipment 32 comprises one or more structures within interior 44 which are configured to manage, separate, feed or receive production from livestock. In the example illustrated in which building 20 is configured to house cattle, such as beef cattle or dairy cattle, livestock equipment 32 comprises stanchion dividers. Other examples of livestock equipment include, but are not limited to, livestock feeding containers, livestock watering devices, milking equipment, egg laying boxes and the like. Although livestock building 20 is illustrated as being substantially rectangular, in other embodiments, livestock building 20 may have other shapes.

Supply fans 34 comprise one or more motor driven fan units supported or mounted in openings 46 and side walls 28 of building 20. Supply fans 34 each have an inlet side directly exposed to an exterior of livestock building 20 and a discharge side directly exposed to the interior 44 livestock building 20. Supply fans 34 blow air outside of building 20 into the interior 44. Similar to supply fans 34, ceiling mounted supply fans 36 comprise motor driven fan units supported or mounted in the ceiling 30 of building 20. Ceiling mounted supply fans 34 each have an inlet side directly exposed to an exterior of livestock building 20 and a discharge side directly exposed to the interior 44 of livestock building 20. Ceiling mounted supply fans 36 blow air from outside the building 20 into interior 44.

Mixing fans 37 comprise one or more motor driven fan units supported or mounted so as to mix air within interior 44. Mixing fans 37 blow air from interior 44 back into interior 44. Mixing fans 37 each have an inlet side directly exposed to the interior of livestock building 20 and a discharge side also directly exposed to the interior 44 of livestock building 20.

Figure 3:
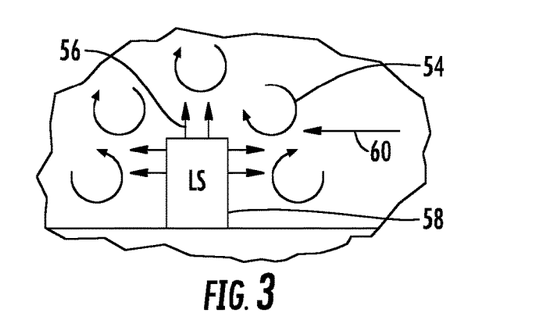
FIG. 3 is an enlarged fragmentary view of the livestock building of FIG. 2.

As shown by FIG. 3, supply fans 34 and 36 and mixing fans 37 create room air flows within interior 44 which results in turbulent airflow 54. The air flow is quantified into kinetic energy. Kinetic energy represents mean air flow motion that is converted into turbulence energy and then ultimately converted into heat by the viscous dissipation. Before viscous dissipation occurs the turbulent airflow 54 is productive as it dissipates heat 56 from livestock 58 through convective cooling. The dissipation capacity (DC) of turbulent airflow 54, also known as dissipation turbulence or dissipation velocity, is calculated from the kinetic energy density within interior 44. This density of turbulent airflow is a function of the kinetic energy of turbulent airflow within interior 44. Supply fans 34 and 36 and mixing fans 37 are collectively configured with appropriate size, velocity or power and number so as to provide interior 44 with a dissipation capacity of between 50 and 250. The dissipation capacity or turbulence ventilation of building 20 is determined as follows:

$$TV = \sqrt{\frac{2 * \Delta P * Q_o}{\rho_{room} * (1 + TI^2) * V_{room}}}$$

Where $\Delta P$=Pressure Drop of Kinetic Energy Device (such as a fan or mixer), Pa
$Q_o$=Volumetric Flow Rate of Kinetic Energy Device, m$^3$/s
$\rho_{room}$=Density of Room Air, kg/m$^3$
TI=Turbulence Intensity
$V_{room}$=Volume of Room, m$^3$ For small diameter mixing fans commonly used in swine production facilities, the TV can be calculated by the following equations. Please be aware that these equations are true for 12-18" diameter fans. Any additional kinetic energy from supply air inlets or larger diameter fans is not included. A more in-depth analysis is required.

SI Version:

$$TV = 1472 * \sqrt{\frac{Q_o}{V_{room}}}$$

$Q_o$=Volumetric Flow Rate of Kinetic Energy Device, m$^3$/s
$V_{room}$=Volume of Room, m$^3$
IP Version:

$$TV = 190 * \sqrt{\frac{Q_o}{V_{room}}}$$

$Q_o$=Volumetric Flow Rate of Kinetic Energy Device, cfm
$V_{room}$=Volume of Room, ft$^3$ Regarding the control system, the TV calculation can be fairly straight forward. The room size should remain constant. The controller will have to calculate the TV based on what stages are currently on and the corresponding volumetric flow rate for each stage. If another source for kinetic energy is present (supply air inlet, supply fan, or larger diameter mixing fan) and is considered a portion of the TV goal, that information will have to be integrated into the control logic.

As compared to laminar airflow 60 which is generally created by solely using fans that discharge air out of the building (fans that have an inlet side exposed to the interior of the livestock building a discharge side exposed to the exterior of the livestock building), turbulent airflow provides enhanced convective dissipation of heat 56 from livestock 58. Because the turbulent airflow 54 created by supply fans 34 and 36 and mixing fans 37 more effectively dissipates heat 56 from livestock 58, livestock production is enhanced. For example, livestock 58 are less dependent at removing body heat through panting and have increased appetites, leading to greater production.

In the example illustrated, supply fans 34 and 36 and mixing fans 37 of livestock building 20 are collectively configured so as to provide a dissipation capacity or term or turbulent ventilation number of between 50 and 71 to break winter time stratification. Dissipation capacities between 50 and 71 during winter time ventilation rates mix the air from ceiling to floor and from end to end of the building 20 creating a uniform and controllable environment for profitable production. During summer ventilation conditions, dissipation capacities exceed what is needed in the winter to break stratification and dissipation is needed to increase the heat release from the livestock through dissipation capacities between 125 and 250.

Because livestock building 20 is defined or characterized by the dissipation capacity, different buildings having different sizes, different fans and different outside environments may all be provided with optimal environmental conditions for livestock production. The use of dissipation capacity allows different buildings with different fans and different outside environments to be directly compared to one another and to allow for the creation or design of similar turbulence densities across all such different buildings. In other words, the use of dissipation capacity provides the benefit of similitude.

Because each of such different buildings is provided with a dissipation capacity of between 50 and 250, each of such different buildings offers enhanced heat dissipation for livestock 58 (cattle, poultry, swine, or other livestock) for enhanced livestock production. In the example illustrated, supply fans 34 and 36 of livestock building 20 are collectively configured so as to provide a dissipation capacity of between 50 and 70 when an average air temperature in livestock building 20 is greater than an air temperature outside the livestock building, such as during winter, and so as to have a dissipation capacity of between 125 and 250 when the average air temperature inside livestock building 20 is above the desired set point for livestock 58 and heat dissipation is needed in livestock building 20, such as during the summer.

Dissipation capacities may vary amongst different livestock as well. For example, for dairy cattle, dissipation capacities between 50 and 175 may be beneficial. For a egg laying buildings, dissipation capacities between 50 and 250 may be beneficial. Swine dissipation capacities will be between 50 and 200 with other ranges for other livestock types]

Figure 4:
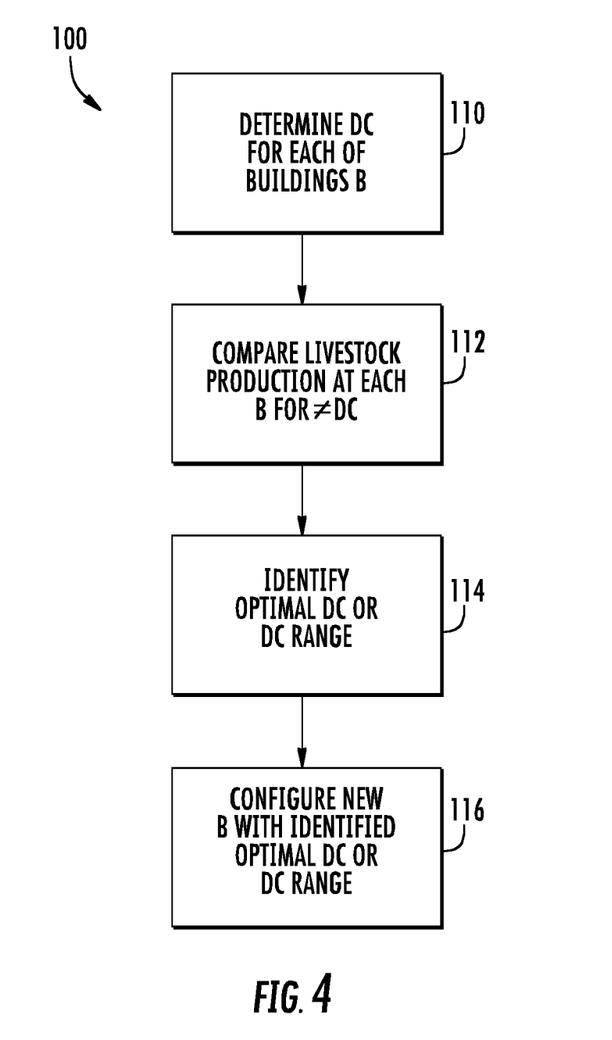
FIG. 4 is a flow diagram of a method for designing livestock buildings according to an example embodiment.

FIG. 4 is a flow diagram of a process or method 100 for configuring a livestock building for enhanced livestock production. As indicated by step 110, the dissipation capacity for each of a plurality of buildings B is determined. In particular, the dissipation capacity for each of the plurality buildings is determined using the above definition. In one embodiment, each of the plurality buildings are the same, wherein the fans are operated at different speeds. In another embodiment, the plurality of buildings are different, either in size or in fan configuration.

As indicated by step 112, the livestock production for a particular type of livestock in each of the buildings is determined and compared with the livestock production for the same type of livestock in the other buildings. The type of livestock is not only the species/breed of livestock, but the age and possibly gender of the livestock to facilitate comparison. In other embodiments, statistical analysis may be used to accommodate situations where the different buildings house livestock which are not identical to one another.

As indicated by step 114, based upon the comparison of livestock production in the different buildings with different dissipation capacities, the optimal dissipation capacity or optimal range for dissipation capacities is identified. Such optimal dissipation capacities may include different optimal dissipation capacities are dissipation capacity ranges for different environmental climates (winter, summer, fall, spring) or for different types of livestock.

As indicated by step 116, the identified optimal dissipation capacities or dissipation capacity ranges are then employed in the configuration of new livestock buildings. For example, method 100 may reveal that for dairy milk production, a building desirably has an optimal dissipation capacity range of between A and B. Using this optimal dissipation capacity range, different buildings having different fans and different dimensions may all be provided with a dissipation capacity falling within the optimal dissipation capacity range. Individual studies for individual building dimensions and individual building configurations are no longer needed for optimal ventilation characteristics to provide optimal livestock production.

As further shown by FIG. 2, livestock building 20 additionally comprises laminar control system 70. Laminar control system 70 comprises temperature sensors 74, 76, fans 37 and controller 78. Temperature sensors 74, 76 comprise sensors configured to detect temperature which are located at various different heights at different locations within interior 44. In the example illustrated, control system 70 includes two sensors: sensor 74 near ceiling 30 and sensor 76 more proximal to floor 22. In other embodiments, control system 70 may include additional sensors at other vertical heights within interior 44. Sensors 74, 76 provide controller 78 with temperature readings at different heights within interior 44 such that controller 78 may determine different laminae or layers of heat within interior 44.

Fans 37 are described above. In the example illustrated fans 37 are adjustable, offering one of multiple available speeds or airflow throughput rates. In another embodiment, fans 37 are merely actuatable between on and off states. Control system 70 utilizes fans 37 to break up laminate of air within interior 44.

Controller 78 comprises one or more processing units configured to generate control signals directing the operation of fans 37 based upon sensed temperature data from temperature sensors 74, 76. For purposes of this application, the term "processing unit" shall mean a presently developed or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, controller 78 may be embodied as part of one or more application-specific integrated circuits (ASICs). Unless otherwise specifically noted, the controller is not limited to any specific combination of hardware circuitry and software, nor to any particular source for the instructions executed by the processing unit.

Controller 78 controls the operation of fans 37 to mix and break up laminae of air at different temperatures for a more uniformity in heat, gases and particulates from floor 22 to ceiling 30. In one embodiment, controller 78 slightly turns particular fans 37 throughout building 20 on and off. In another embodiment, controller 78 generate control signals to adjust the flow rate or power setting of one or more of fans 37. In the embodiment illustrated, controller 78 controls the operation fans 37 to not only break up laminae of different heat zones, but to also achieve the desired dissipation turbulence. In some embodiments, laminar control system 70 may be omitted. In yet other embodiments, laminar control system 70 may be used in a building independent of achieving desired dissipation turbulence.

Figure 5:
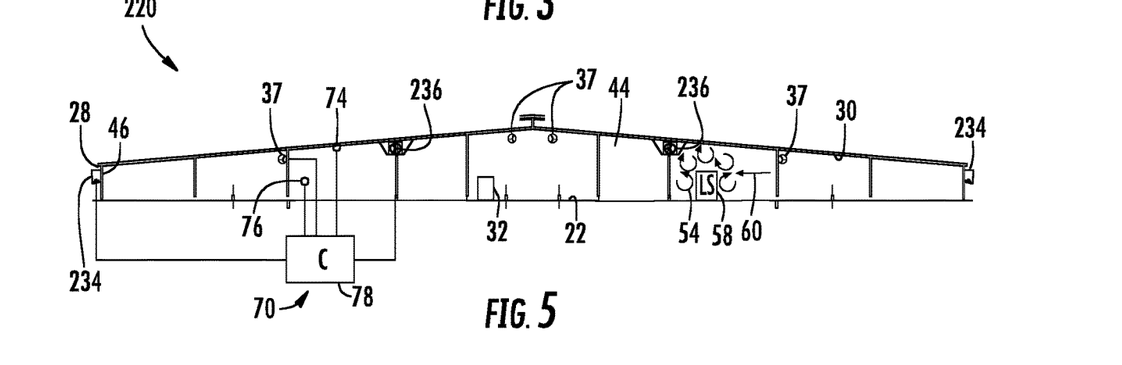
FIG. 5 is a sectional view of an example alternative embodiment of the livestock building of FIG. 2.

FIG. 5 illustrates livestock building 220, another embodiment of livestock building 20. In one embodiment, building 220 comprises a swine building. Like livestock building 20, livestock building to 20 is designed to provide optimal environmental conditions for livestock production by achieving a optimal three-dimensional or multidimensional airflow density, dissipation turbulence. Unlike livestock building 20, livestock building 220 achieves a desired dissipation turbulence using discharge fans 234 and mixing fans 236 in place of fans 34 and 36, respectively. Livestock building 220 also includes mixing fans 37 described above. Those remaining elements of livestock building 220 which correspond to elements of livestock building 20 are numbered similarly.

Each of discharge fans 234 comprises one or more motor driven fan units supported or mounted in openings 46 and side walls 28 of building 220. Discharge fans 234 each have an inlet side directly exposed to the interior 44 of livestock building 220 and a discharge side directly exposed to the exterior livestock building 220. Discharge fans 234 blow air from interior 44 through opening 46 to the exterior of building 220. As a result, building 220 comprises a negative pressure ventilation system or negative pressure building.

Mixing fans 236 comprise motor driven fan units supported by ceiling 30 of building 220. Ceiling mounted mixing fans 236 each have an inlet side directly exposed to an interior 44 of livestock building 220 a discharge side directly exposed to the interior 44 livestock building 20. Unlike ceiling fans 36 and similar to mixing fans 37, mixing fans 236 do not draw air from outside of the building, but merely mix existing air within the interior 44 of building 220 increasing the kinetic energy density resulting in greater dissipation capacities.

Discharge fans 234 and mixing fans 236, 37 are collectively configured with appropriate size, velocity or power and number so as to provide interior 44 with a dissipation capacity of between 50 and 250. The dissipation capacity or TV number of building 220 is determined as follows:

$$TV = \sqrt{\frac{2 * \Delta P * Q_o}{\rho_{room} * (1 + TI^2) * V_{room}}}$$

Where $\Delta P$=Pressure Drop of Kinetic Energy Device, Pa $Q_o$=Volumetric Flow Rate of Kinetic Energy Device, m³/s $\rho_{room}$=Density of Room Air, kg/m³

TI=Turbulence Intensity $V_{room}$=Volume of Room, m³

For small diameter mixing fans commonly used in swine production facilities, the TV can be calculated by the following equations. Please be aware that these equations are true for 12-18" diameter fans. Any additional kinetic energy from supply air inlets or larger diameter fans is not included. A more in-depth analysis is required.

SI Version:

$$TV = 1472 * \sqrt{\frac{Q_o}{V_{room}}}$$

$Q_o$=Volumetric Flow Rate of Kinetic Energy Device, m³/s
$V_{room}$=Volume of Room, m³
IP Version:

$$TV = 190 * \sqrt{\frac{Q_o}{V_{room}}}$$

$Q_o$=Volumetric Flow Rate of Kinetic Energy Device, cfm
$V_{room}$=Volume of Room, ft³

Regarding the control system, the TV calculation can be fairly straight forward. The room size should remain constant. The controller will have to calculate the TV based on what stages are currently on and the corresponding volumetric flow rate for each stage. If another source for kinetic energy is present (supply air inlet, supply fan, or larger diameter mixing fan) and is considered a portion of the TV goal, that information will have to be integrated into the control logic.

As compared to laminar airflow 60 which is generally created by solely using fans that discharge air out of the building (fans that have an inlet side exposed to the interior of the livestock building a discharge side exposed to the exterior of the livestock building), turbulent airflow provides enhanced dissipation of heat 56 from livestock 58. Because the turbulent airflow 54 created by supply fans 34 and 36 more effectively convectively dissipates heat 56 from livestock 58, livestock production is enhanced. For example, livestock 58 expend less energy getting rid of body heat through panting and the like and have an increased appetite, which leads to greater production.

In the example illustrated, discharge fans 234 and mixing fans 236, 37 of livestock building 220 are collectively configured so as to provide a dissipation capacity of between 50 and 71 and average air temperature inside building 20 is greater than the air temperature outside the livestock building, such as during winter, and so as to have a dissipation capacity of between 125 and 250 when the average air temperature inside livestock building 220 is less than the air temperature outside of livestock building 220, such as during the summer.

Because livestock building 220 is defined or characterized by the dissipation capacity, different buildings having different sizes, different fans and different outside environments may all be provided with optimal environmental conditions for livestock production. The use of dissipation capacity allows different buildings with different fans (discharge and mixing fans) and different outside environments to be directly compared to one another and to allow for the creation or design of similar turbulence densities across all such different buildings. In other words, the use of dissipation capacity provides the benefit of similitude.

Because each of such different buildings is provided with a dissipation capacity of between 50 and 250, each of such different buildings offers enhanced heat dissipation for livestock 58 (cattle, poultry, swine, or other livestock) for enhanced livestock production. In the example illustrated, supply fans 234 and 236 of livestock building 220 are collectively configured so as to provide a dissipation capacity of between 50 and 70 when an average air temperature in livestock building 220 is greater than an air temperature outside the livestock building, such as during winter, and so as to have a dissipation capacity of between 125 and 250 when the average air temperature inside livestock building 220 is less than the air temperature outside of livestock building 220, such as during the summer.

Figure 6:
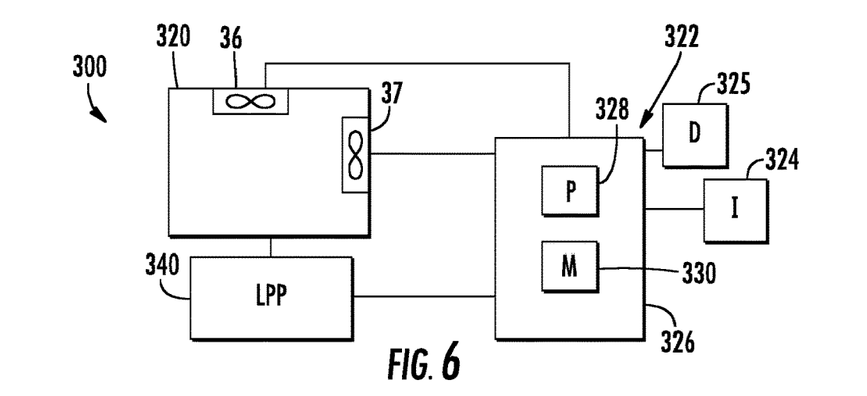
FIG. 6 is a schematic diagram of an example livestock building control system.

FIG. 6 is a schematic diagram of an example livestock building control system 300 which comprises livestock building 320 and control system 322. Livestock building 320 (schematically shown) comprise a building in which livestock are housed. Livestock building 322 comprises supply fans 36 and mixing fans 37 described above. For purposes of this disclosure, the term "fans" also encompasses blowers, wherein the output of such blowers is adjusted by adjusting the speed at which turbines are turned or by adjusting various valves through which air flows.

Control system 322 comprises system which controls the total or overall average airflow within livestock building 320. Control system 322 comprises input 324 and controller 326. Input 324 comprise one arises by which data, selections and/or commands or input to controller 322. Input 324 may comprise a touch screen, a keyboard, a keypad, a microphone which speech recognition programming or any other various user input devices. Display 325 by the device by which information is presented to users of control system 322.

Controller 322 comprises one or more processing units 328 which, following instructions provided in a non-transitory computer-readable medium or memory 330, control the operation of fans 36, 37 to control the overall average airflow or kinetic energy of airflow within building 320. In one implementation, controller 322 is initially programmed or set up to determine the particular turbulence ventilation characteristics of building 320. In one implementation, controller 322 carries out method 400 outlined in FIG. 7.

Figure 7:
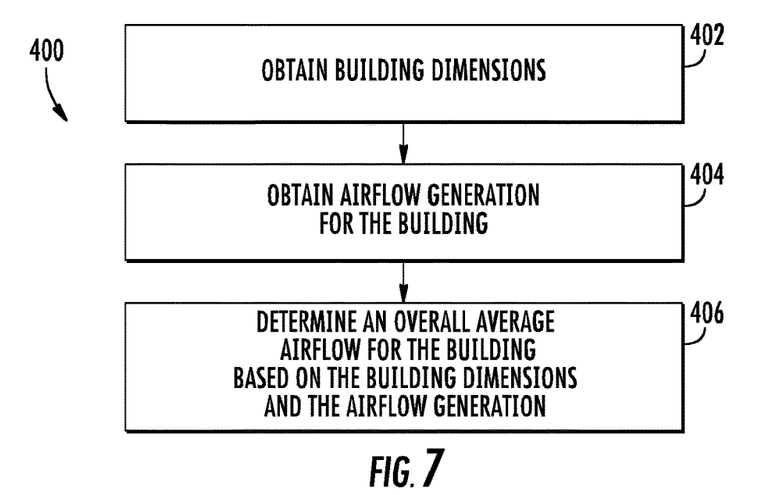
FIG. 7 is a flow diagram of an example method for determining an overall average airflow value for a building.

As indicated by block 402, during set up, controller 322 obtains dimensional information for livestock building 320. In one implementation, controller 322 retrieves such information from an external. In one implementation, controller 322 is preprogrammed with such dimensional information. In one implementation, controller 322 prompts a person to enter dimensions of livestock building 320, such as its length, width and average height.

As indicated by block 404, controller 320 further determines the volumetric flow rate of kinetic energy devices or airflow generation devices, fans 36 and 37, for building 320. In one implementation, such kinetic energy is based upon the pressure drop of kinetic energy for each device and the volumetric flow rate of each device. As indicated by block 406, based upon such information, controller 320 determines the overall average airflow or airflow value for livestock building 320. In one implementation, the overall average airflow value comprises the dissipation capacity of turbulence ventilation number based upon the formula described above.

Figure 8:
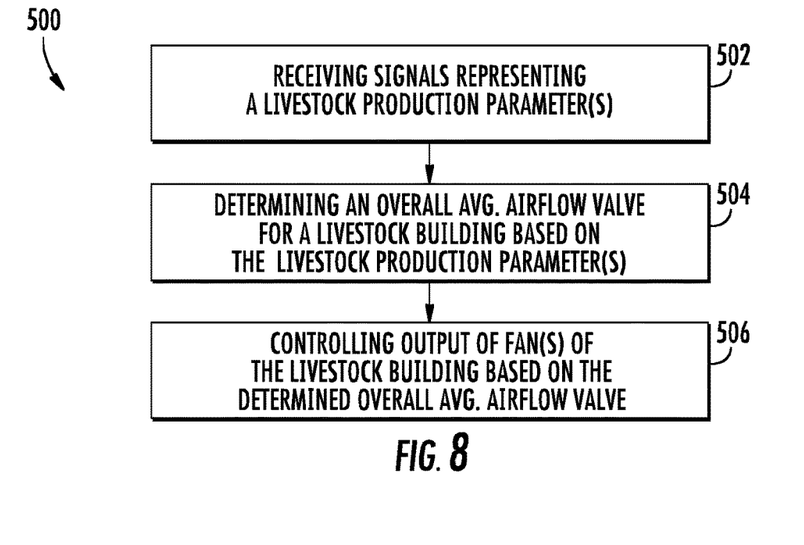
FIG. 8 is a flow diagram of an example method for determining an optimal overall average airflow value and controlling fan output to attain the determined optimal overall average airflow value.

FIG. 8 is a flow diagram of an example method 500 by which controller 322 controls fans 36, 37 of building 320. As indicated by block 502, controller 322 receives signals representing one or more livestock production parameters 340 (shown in FIG. 6). For purposes of this disclosure, a livestock production parameter is a parameter or factor pertain to building 320 and/or the livestock housed within building 320 other than the volume of livestock building 320. Examples of livestock production parameters include, but are not limited to, a humidity level within livestock building 320, a temperature within livestock building 320, a live weight of livestock in livestock building 320, a count of livestock in livestock building 320, an average lactation stage of animals in livestock building 320, a production rate of animals in livestock building 320 and a type or classification of livestock building 320.

As indicated by block 504, based upon the one or more livestock production parameters, controller 322 determines or selects an overall average airflow value for livestock building 320. In one implementation, using the one or more receive livestock production parameter values, controller 322 identifies the best or optimal overall average airflow value for building 320 with respect to one or more targets or objectives. For example, in one implementation, controller 322 may consult a stored lookup table buffer stored in memory 330 or an external memory) to identify an optimal average airflow value or an optimum range of average airflow values that optimizes production, such as rate of gain, milk production or egg laying. In another implementation, controller 322 consults a stored lookup table or otherwise determines an optimal average airflow value or optimal range of airflow values that optimizes animal health or optimizes/reduces the level of stress upon house livestock.

In one implementation, the stored lookup table is based upon historical data for livestock building 320 and/or for other livestock buildings or facilities similar to building 320. In one implementation, the stored lookup table consulted by controller 322 is generated by (1) obtaining statistics or data regarding a particular objective (livestock production, rate of gain, milk production, egg laying, animal stress, animal health) over a period of time. During this same period of time, operation of one or both of fans 36, 37 is adjusted vary the overall average airflow (dissipation capacity or turbulence ventilation number) of the building. The changes in the overall average airflow throughout the building are correlated to the changes in the statistics or data for the particular objective. In such a manner, different overall average airflow values, turbulence ventilation numbers or dissipation capacity values are linked to or associated with different livestock production characteristics such as rate of gain, milk production, animal stress, animal health and the like. In one implementation, the determination of optimal overall average airflow values for different objectives and for use in different environments having different livestock production parameters is completed independent of building 320. Because the overall average airflow value is a standard unit of value applicable to all buildings, the determined optimal overall average airflow values may be applied to the control of multiple different, and possibly different configured, livestock production buildings.

As indicated by block 506, upon identifying or determining the overall average airflow value or range of values that best satisfies the one or more objectives for livestock production, controller 322 outputs electro control signals adjusting the output of one or both of fans 36, 37 to achieve an overall average airflow value (turbulence ventilation number or dissipation capacity value) that matches the determined overall average airflow value of the falls within the determined range of values.

Figure 9:
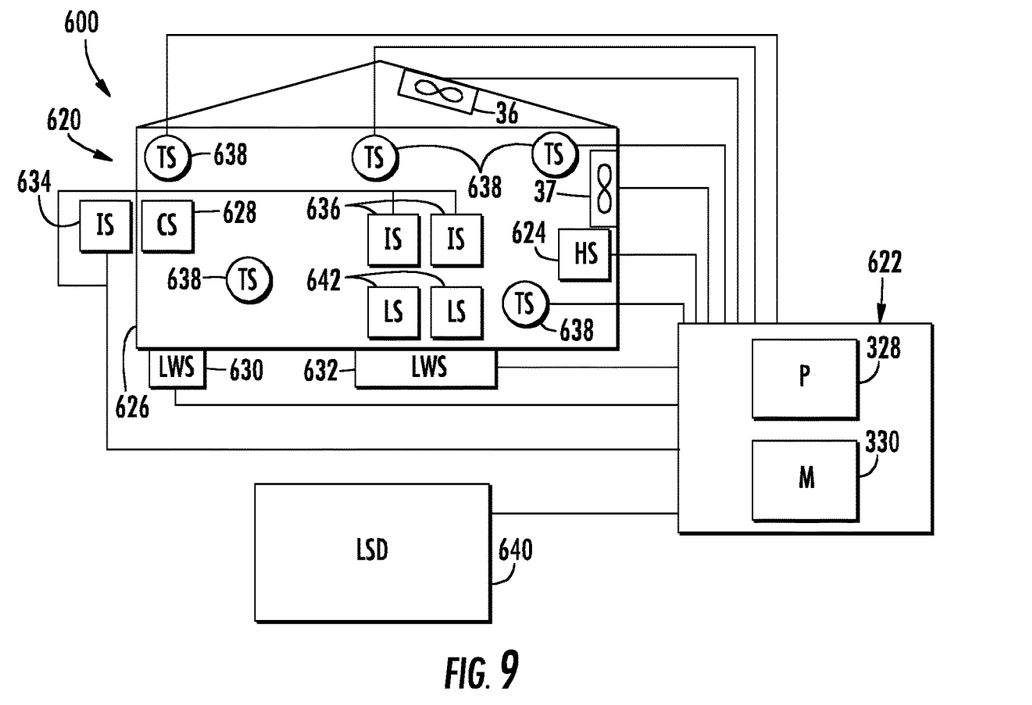
FIG. 9 is a schematic diagram of another example livestock building control system.

FIG. 9 schematically illustrates livestock building control system 600 which comprises livestock building 620 and control system 622. Building 620 is similar to building 320 except the billing 620 is specifically illustrated as comprising a humidity sensor 624, entrance/exit 626, count sensor 628, live weight sensors 630, 632, livestock identity sensors 634, 636 and temperature sensors 638. Controller 622 is similar to controller 322 except that controller 622 is additionally illustrated as comprising or as communicating with livestock database 640.

Humidity sensor 624 comprises a sensor or multiple sensors that detect moisture humidity within building 620. Such signals are transmitted to controller 622. The sensed humidity serves as a factor or variable used by controller 622 to determine or select the optimum average airflow value for building 620.

Entrance/exit 626 comprises one or more openings by which livestock enter or exit building 620. Count sensor 628 comprises a sensor proximate to entrance/exit 626 to sense or detect the ingress or egress of livestock from building 620. Count sensor 628 outputs signals indicating the anger us or egress of livestock from billing 620, were such signals are communicated to controller 622 which utilizes such signals to determine the number or count of livestock within building 620. As noted above, the counter number livestock in building 620 serves as a variable which may impact the determination or selection of the optimum average overall airflow value (turbulence ventilation number or dissipation capacity value) for building 620. In one implementation, count sensor 628 comprises a photo an inter-detector. In another implementation, count sensor 628 senses RFID tags or other readable elements carried by each animal. Although illustrated as located adjacent to entrance/exit 626, in other implementations, count sensor 628 may alternatively detect the number of livestock within building 620 at any one time by counting the number of such livestock, rather than detecting ingress or egress of such livestock.

Live weight sensors 630 sense and facilitate determination of the overall live weight of livestock within building 620. In one implementation, live weight 630 comprises a scale adjacent entrance/exit 626, wherein each animal entering or leaving building 620 is weighed, which resulted logical signals indicating such weight being communicated to controller 622. In one implementation, controller 22 utilizes the total live weight of livestock within building 620 as a factor or variable in selecting or determining the optimal overall average airflow for building 620 for a particular selected objective.

Live weight sensors 632 is similar to live weight sensors 630 except that live weight sensors 632 senses the live weight of livestock 642 (schematically shown) within building 620 at a particular moment, rather than adding and subtracting the weight of animals as a enter and exit building 620. In one implementation, live weight sensors 632 may comprise scales proximate to stanchions, pens, crates or other livestock residence locations within building 620. Live weight sensors 632 transmit signals indicating the current live weight to controller 622, where controller 622 utilizes the total live weight as a factor variable in selecting the optimal overall average airflow value for building 620.

Identity sensors 634, 636 detect the identity of the individual livestock within building 620. In the example illustrated, Danny sensor 634 is proximate to entry/exit 626 to identify such livestock as they enter and exit building 620. Identity sensors 636 hello okay within building 620 at the residence locations of livestock not only sense what life sector in building 620, but where such livestock are individually stationed in livestock building 620. In one implementation, identity sensors 634, 636 cents identification collars, tags or other Indymedia carried by the individual livestock or animals. Identity sensors 634 output electrical signals indicating the identity of the livestock within building 620, wherein the alleged sealer transmitted to controller 622.

Controller 622 utilizes the determined identity of the specific animals within building 622 determine the optimal overall average airflow value (turbulence ventilation number, dissipation capacity value) for building 620. In the example illustrated, controller 622 accesses livestock database 640. Livestock database 640 stores records indicating various characteristics of the individually identified livestock. Livestock database 640 stores. For example, in a dairy facility, livestock database 640 may store information such as the current milk production for an individual cow/goat, the lactation state of the individual cow/goat, the age of the individual cow/goat, the weight of the individual cow/goat and the like. In a poultry or hog facility, livestock database 640 may store information such as the age of the pig or bird, its present weight, its present health, its current expected or estimated rate of gain at the particular more time, its nutritional needs or the like.

Based upon the determination of what specific individual animals are within livestock building 620, controller 622 may determine the overall characteristics of the animals or an average of specific characteristics of the animals within building 620. Based upon this determination, controller 622 selects the optimal overall average airflow for building 620 and adjusts the operation of the kinetic energy devices, fans 36, 37, to attain the determined optimal overall average airflow value. For example, with swine, beef or meat poultry production, as animals progress in age towards market weight, the optimal overall average airflow for building 620 may change. With dairy production, as the average lactational stage of the cows change, the optimal overall average airflow for building 620 may change. Similar criteria apply to poultry for a production.

Temperature sensors 638 comprise sensors located throughout different regions or zones of building 622 identify the different temperatures of the air in different regions of building 620. Signals from the different temperature sensors 638 are compared to one another, wherein differences between temperatures in different regions are utilized by the controller 622 to determine the level of equilibrium of airflow throughout the different zones or regions of building 620. For example, different temperature readings in different zones may indicate different airflow rates in different regions of the building. In one implementation, in response to such a determined disparity between airflow in different regions of building 620, controller 622 adjusts the output of the different fans 36, 37 in the different regions or zones, relative to one another, to enhance equilibrium across the different zones are regions while maintaining the optimal or selected overall average airflow rate for building 620.

Although control system 622 is illustrated as utilizing each of the livestock production parameters to determine or identify the optimum overall average airflow value for the building, in other implementations, only some of the noted livestock production parameters are employed by controller 622 to identify the optimal overall average airflow value. Some implementations, other livestock production parameters are employed by controller 622 to identify the optimal overall average airflow value for building 620 at any one moment in time.

Figure 10:
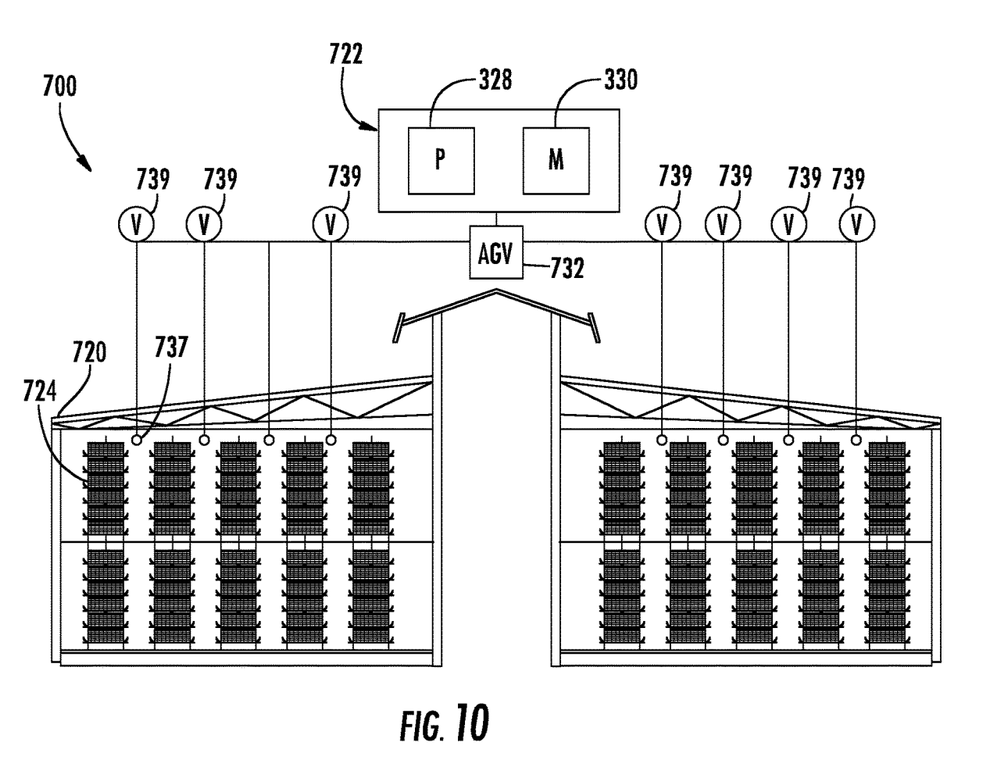
FIG. 10 is a diagram of another example livestock building control system.
Figure 11:
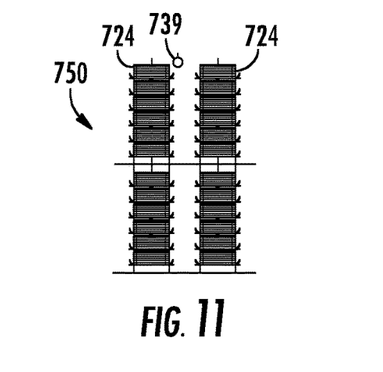
FIG. 11 is a diagram of an example zone of a livestock building of the system of FIG. 10.
Figure 12:
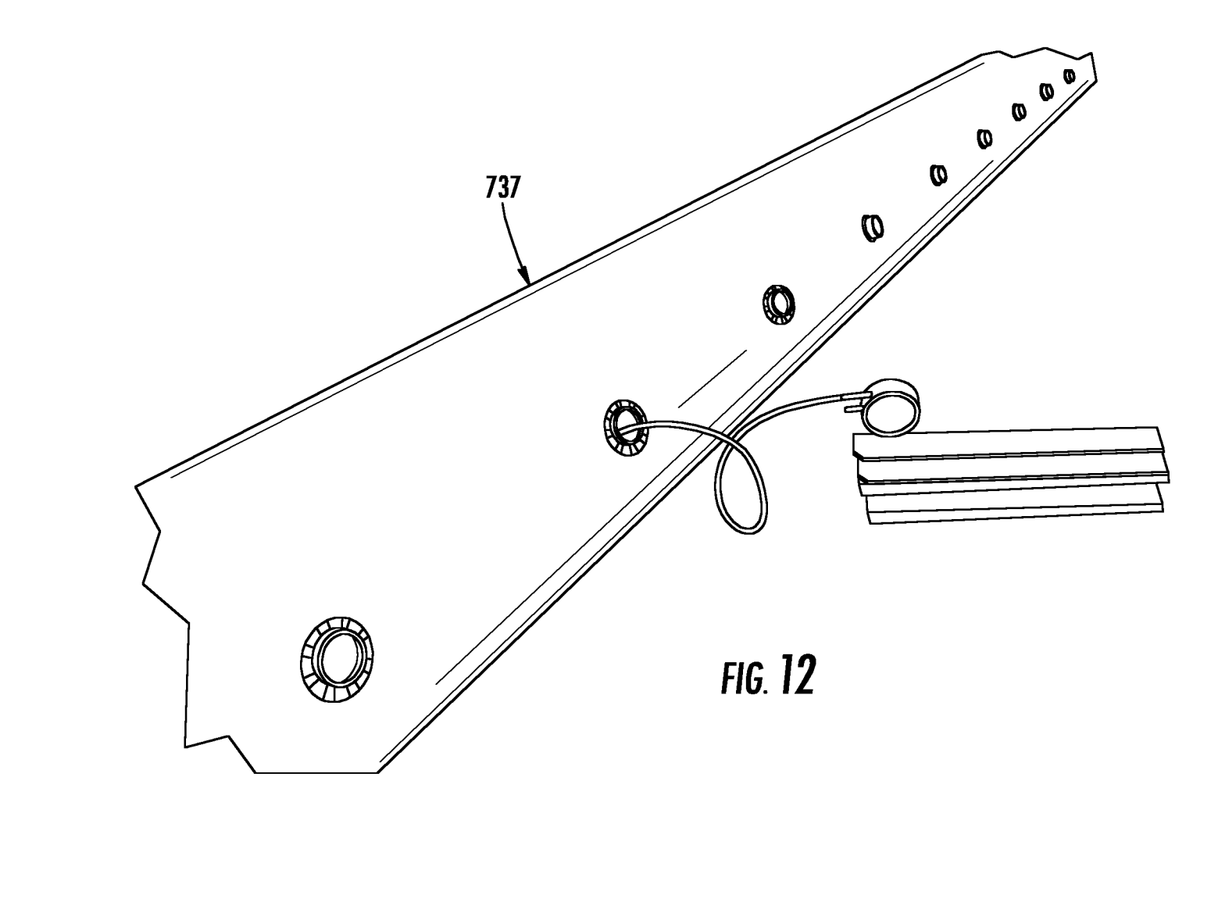
FIG. 12 is a perspective view of an example air supplying or mixing plenum of the system of FIG. 10.

FIG. 10 is a diagram of livestock building control system 600 which comprises livestock building 720 and control system 722. In the example illustrated, livestock building 720 comprises a poultry facility comprising multiple batteries or stacks 724 (an individual one of which is shown in FIG. 11) of poultry residences, batteries or crates. Each pair of stacks 724 is defined as a quadrant or zone. In the example illustrated, one or more air generation units 732 supply air through tubes, sleeves or other air plenums 737. Control over the amount or rate which air is supplied through each of such plenums 737 is done by controlling output of the one or more air generation unit 732 and/or by adjusting the state of the individual valves 739 associated with respective plenums 737. Each zone has an associated fan or blower 737. FIG. 12 is a perspective view of an example blower 737. Blower 737 direct air and mixed air in each of their respective zones. The rate at which air is supplied through such blowers 737 (if at all) is controlled through the control of air generation unit by one or more valves associated with the respective plenums 737.

Controller 722 operates similar to controller 622. Controller 722 stores a predetermined internal volume of building 728 utilize this volume and the current volumetric flow rate of the plenums 737 (mixing fans and supply fans in other implementations) to determine a current turbulence ventilation number for building 620 and to adjust the output of plenums 737 to achieve an optimal overall average airflow value (turbulence ventilation or dissipation capacity) for building 720. As with controller 622, controller 722 determine the optimum overall average airflow value based upon one or more livestock production parameters (described above) obtained through or from various sensors.

In one implementation, rather than adjusting the output of plenums 737 to achieve an overall average airflow value for the entire building 720, controller 722 adjusts the output of individual plenums 737 to achieve an optimal airflow value (turbulence ventilation number or dissipation capacity value) for distinct individual zones are regions within building 720. In such an implementation, each individual zone or region has its own optimum turbulence ventilation/average airflow/dissipation capacity value based upon individual livestock production parameters associated with the particular zone or region. For example, FIG. 11 illustrates one example zone or region 750 comprising of two batteries 724 and an individual plenum 739. This individual zone 750 has a distinct sub-volume of the overall volume of building 720. The volumetric airflow for this zone is provided by plenum 739. Plenum 739 itself may include multiple outlets through which air is discharged. Controller 722 determines the optimal airflow value for each zone 750 of building 720 and controls the output of the associated plenum 737 to attain the optimum average airflow value for each individual zone 750.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements.

What is claimed is:

1. A method comprising:
providing supply fans in a livestock building that are configured to blow air into an interior of the livestock building,
wherein an overall blowing capacity of the supply fans is such that an interior of the livestock building has a turbulence ventilation (TV) number of between 50 and 250, the TV number being based upon a kinetic energy density of turbulent airflow ($(m^3/s)/m^3$) within the livestock building, wherein:

$$TV = 1472 * \sqrt{\frac{Q_o}{V_{room}}}$$

$Q_o$=Volumetric Flow Rate of Kinetic Energy Device, $m^3/s$
$V_{room}$=Volume of Room, $m^3$.

2. The method of claim 1, wherein the TV number is between 50 and 70 when an average air temperature in the livestock building is greater than in air temperature outside the livestock building.

3. The method of claim 2, wherein the TV number is between 125 and 250 when the average air temperature inside the livestock building is less than air temperature outside the livestock building.

4. The method of claim 1, wherein the supply fans have an inlet side directly exposed to an exterior of the livestock building and a discharge side directly exposed to the interior of the livestock building.

5. The method of claim 1 further comprising determining the TV number upon which the overall blowing capacity of the supply fans provided is determined.

6. A method comprising:
providing discharge fans in a livestock building that are configured to blow air out of the livestock building; and
providing mixing fans in the livestock building, wherein an overall capacity of the discharge fans and the mixing fans is such that an interior of the building has a turbulence ventilation (TV) number of between 50 and 250, the TV number being based upon a kinetic energy density of turbulent airflow ($(m^3/s)/m^3$) within the livestock building, wherein:

$$TV = 1472 * \sqrt{\frac{Q_o}{V_{room}}}$$

$Q_o$=Volumetric Flow Rate of Kinetic Energy Device, $m^3/s$
$V_{room}$=Volume of Room, $m^3$.

7. The method of claim 6 further comprising determining the TV number upon which the overall capacity of the discharge fans and the mixing fans provided is determined.

8. An apparatus comprising:
a livestock building;
supply fans configured to blow air into an interior of the livestock building, wherein an overall blowing capacity of the supply fans is such that an interior of the livestock building has a turbulence ventilation (TV) number of between 50 and 250, the TV number being based upon a kinetic energy density of turbulent airflow ($(m^3/s)/m^3$) within the livestock building, wherein:

$$TV = 1472 * \sqrt{\frac{Q_o}{V_{room}}}$$

$Q_o$=Volumetric Flow Rate of Kinetic Energy Device, $m^3/s$
$V_{room}$=Volume of Room, $m^3$.

9. The apparatus of claim 8, wherein the TV number is between 50 and 70 when an average air temperature in the livestock building is greater than in air temperature outside the livestock building.

10. The apparatus of claim 8, wherein the TV number is between 125 and 250 when the average air temperature inside the livestock building is less than air temperature outside the livestock building.

11. The apparatus of claim 8, wherein the supply fans have an inlet side directly exposed to an exterior of the livestock building and a discharge side directly exposed to the interior of the livestock building.

12. A method comprising:
determining a turbulence ventilation (TV) number for each of a plurality of livestock building interiors, the TV number being based upon a kinetic energy density of turbulent airflow ($(m^3/s)/m^3$) within each respective livestock building interior;
comparing livestock production for a particular livestock type in each respective livestock building interior for each of the determined TV numbers;
identifying an optimal TV number range for livestock production for the particular type of livestock based upon the livestock production comparison, the TV number range having upper and lower bounds each between 50 and 250; and
providing and operating a plurality of fans in the livestock building for the particular livestock type to provide each of the plurality of livestock building interiors with the identified optimal TV number such that each of the plurality of livestock building interiors has a TV number falling within the optimal TV number range, wherein the plurality of fans comprise fans configured to blow air into an interior of each respective livestock building interior, wherein the TV number is determined as follows:

$$TV = 1472 * \sqrt{\frac{Q_o}{V_{room}}}$$

$Q_o$=Volumetric Flow Rate of Kinetic Energy Device, $m^3/s$
$V_{room}$=Volume of Room, $m^3$.

13. A method comprising:
receiving signals representing a livestock production parameter;
determining an overall average air flow value for a livestock building based on the livestock production parameter for the livestock building;
providing supply fans in the livestock building that are configured to blow air into an interior of the livestock building, and
controlling output of the supply fans of the livestock building based upon the signals representing the livestock production parameter and such that an interior of the livestock building has a turbulence ventilation (TV)

number of between 50 and 250, the TV number being based upon a kinetic energy density of turbulent airflow $((m^3/s)/m^3)$ within the livestock building, wherein:

$$TV = 1472 * \sqrt{\frac{Q_o}{V_{room}}}$$

$Q_o$=Volumetric Flow Rate of Kinetic Energy Device, $m^3/s$ $V_{room}$=Volume of Room, $m^3$.

14. The method of claim 13, wherein the livestock production parameter comprises one or more livestock production parameters selected from a group of parameters consisting of: a humidity level within the livestock building; a temperature within the livestock building; a live weight of livestock in the livestock building; a count of livestock in the livestock building; and average lactation stage of animals in the livestock building; and a production rate of animals in the livestock building.

15. The method of claim 13 further comprising:
receiving signals from a plurality of differently located temperature sensors in the building; and
adjusting output of different fans relative to one another based on the signals from the plurality of differently located temperature sensors while maintaining the TV number.

16. A method comprising:
obtaining livestock production data for a livestock building over a period of time;
providing supply fans in the livestock building that are configured to blow air into an interior of the livestock building;
adjusting the operational settings of the supply fans within a livestock building over the period of time to provide different turbulence ventilation (TV) numbers of between 50 and 250;
correlating changes in livestock production to changes in the TV numbers; and
operating the supply fans of the livestock building so as to produce a TV number correlating to maximum livestock production, wherein the TV number is based upon a kinetic energy density of turbulent airflow $((m^3/s)/m^3)$ within the livestock building and wherein the TV number is determined as follows:

$$TV = 1472 * \sqrt{\frac{Q_o}{V_{room}}}$$

$Q_o$=Volumetric Flow Rate of Kinetic Energy Device, $m^3/s$ $V_{room}$=Volume of Room, $m^3$.

* * * * *